US010266662B2

(12) United States Patent
Jimenez Garcia et al.

(10) Patent No.: US 10,266,662 B2
(45) Date of Patent: Apr. 23, 2019

(54) PRODUCTION OF SHAPED ARTICLES

(71) Applicant: BASF SE, Ludwigshafen (DE)

(72) Inventors: Lucia Jimenez Garcia, Mannheim (DE); Kathrin Michl, Ludwigshafen (DE); Ingolf Hennig, Neulussheim (DE); Kitty Chih-Pei Cha, Ludwigshafen (DE); Matthias Georg Schwab, Mannheim (DE)

(73) Assignee: BASF SE, Ludwigshafen (DE)

( * ) Notice: Subject to any disclaimer, the term of this patent is extended or adjusted under 35 U.S.C. 154(b) by 253 days.

(21) Appl. No.: 15/301,842

(22) PCT Filed: Mar. 26, 2015

(86) PCT No.: PCT/EP2015/056542
§ 371 (c)(1),
(2) Date: Oct. 4, 2016

(87) PCT Pub. No.: WO2015/150213
PCT Pub. Date: Oct. 8, 2015

(65) Prior Publication Data
US 2017/0174849 A1 Jun. 22, 2017

(30) Foreign Application Priority Data
Apr. 4, 2014 (EP) .................... 14163584

(51) Int. Cl.
*C08J 5/02* (2006.01)
*C08J 5/04* (2006.01)
*C08J 5/10* (2006.01)
*C08F 220/18* (2006.01)
*C08L 33/08* (2006.01)

(52) U.S. Cl.
CPC .............. *C08J 5/02* (2013.01); *C08F 220/18* (2013.01); *C08J 5/043* (2013.01); *C08J 5/10* (2013.01); *C08L 33/08* (2013.01); *C08F 2220/1808* (2013.01); *C08F 2800/20* (2013.01); *C08J 2333/00* (2013.01); *C08J 2333/08* (2013.01); *C08L 2201/50* (2013.01)

(58) Field of Classification Search
None
See application file for complete search history.

(56) References Cited

U.S. PATENT DOCUMENTS

| | | |
|---|---|---|
| 3,238,173 A | 3/1966 | Bailey et al. |
| 3,360,599 A | 12/1967 | Nyberg et al. |
| 3,726,824 A | 4/1973 | Saunders, et al. |
| 3,734,686 A | 5/1973 | Douglas |
| 4,076,917 A | 2/1978 | Swift et al. |
| 4,269,749 A | 5/1981 | Marriott et al. |
| 5,143,582 A | 9/1992 | Arkens et al. |
| 5,661,213 A | 8/1997 | Arkens et al. |
| 5,763,524 A | 6/1998 | Arkens et al. |
| 6,136,916 A | 10/2000 | Arkens et al. |
| 6,207,756 B1 | 3/2001 | Datta et al. |
| 6,221,973 B1 | 4/2001 | Arkens et al. |
| 2004/0082689 A1 | 4/2004 | Taylor et al. |
| 2012/0245277 A1* | 9/2012 | Michl ............... C09D 135/00 524/556 |
| 2013/0127085 A1* | 5/2013 | Kalbe ............... C09D 105/00 264/134 |
| 2013/0184143 A1* | 7/2013 | Corral ............... C04B 35/632 501/154 |
| 2015/0037673 A1* | 2/2015 | Zaghib ............... H01M 4/136 429/221 |
| 2015/0239741 A1* | 8/2015 | Burton ............... C08G 65/321 525/327.3 |
| 2017/0018326 A1* | 1/2017 | Sotzing .............. H01B 1/24 |
| 2018/0112094 A1* | 4/2018 | Swogger ............. C09D 7/45 |

FOREIGN PATENT DOCUMENTS

| | | |
|---|---|---|
| DE | 2 214 450 | 10/1972 |
| DE | 40 03 422 A1 | 8/1991 |
| DE | 42 13 965 A1 | 11/1993 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 040 419 B1 | 7/1985 |
| EP | 0 445 578 A2 | 9/1991 |
| EP | 0 567 812 A1 | 11/1993 |
| EP | 0 583 086 A1 | 2/1994 |
| EP | 0 614 922 A2 | 9/1994 |
| EP | 0 651 088 A1 | 5/1995 |
| EP | 0 672 920 A1 | 9/1995 |
| EP | 0 771 328 B1 | 5/1997 |
| EP | 1 005 508 B1 | 6/2000 |
| EP | 1 240 205 B1 | 9/2002 |
| EP | 1 448 733 B1 | 8/2004 |
| EP | 2 216 358 A1 | 8/2010 |
| EP | 2 328 972 B1 | 6/2011 |

(Continued)

OTHER PUBLICATIONS

U.S. Appl. No. 14/238,928, filed Jun. 12, 2014, US 2015-0004109 A1, Vandana Kurkal-Siebert, et al.

(Continued)

*Primary Examiner* — Mary Lynn F Theisen
(74) *Attorney, Agent, or Firm* — Oblon, McClelland, Maier & Neustadt, L.L.P.

(57) ABSTRACT

Disclosed are electrically conducting shaped articles and also a process for producing same from granular and/or fibrous substrates.

13 Claims, No Drawings

(56) References Cited

FOREIGN PATENT DOCUMENTS

| WO | 99/09100 A1 | 2/1999 | | |
|----|---|---|---|---|
| WO | 2009/126592 A2 | 10/2009 | | |
| WO | 2010/034645 A1 | 4/2010 | | |
| WO | 2010/086176 A1 | 8/2010 | | |
| WO | WO-2010086176 A1 * | 8/2010 | ............ | B82Y 30/00 |
| WO | 2011/029810 A1 | 3/2011 | | |
| WO | 2011/144321 A1 | 11/2011 | | |
| WO | 2012/117017 A1 | 9/2012 | | |

OTHER PUBLICATIONS

U.S. Appl. No. 14/384,095, filed Sep. 9, 2014, US 2015-0030968 A1, Matthias Georg Schwab, et al.
U.S. Appl. No. 61/761,254, filed Feb. 6, 2013, Hye Jin Park, et al.
U.S. Appl. No. 14/785,971, filed Oct. 21, 2015, US 2016-0077022 A1, Steffen Waglöhner, et al.
U.S. Appl. No. 15/024,796, filed Mar. 24, 2016, US 2016-0225991 A1, Matthias Georg Schwab, et al.
U.S. Appl. No. 15/118,796, filed Aug. 12, 2016, Matthias Georg Schwab, et al.
U.S. Appl. No. 14/914,558, filed Feb. 25, 2016, US 2016-0207776 A1, Tobias Hintermann, et al.
U.S. Appl. No. 15/301,842, filed Oct. 4, 2016, Lucia Jimenez Garcia, et al.
International Search Report dated Jun. 17, 2015 in PCT/EP2015/056542 Filed Mar. 26, 2015.

* cited by examiner

PRODUCTION OF SHAPED ARTICLES

The present invention provides a process for producing a shaped article from granular and/or fibrous substrates, which comprises applying an aqueous dispersion PG, prepared from a) an aqueous polymer dispersion whose dispersion polymer has a glass transition temperature Tg, and
b) an aqueous graphene dispersion, wherein the weight fraction of graphene is 0.01 and 20 parts by weight per 100 parts by weight of dispersion polymer (solids/solids), to the granular and/or fibrous substrate, optionally shaping the granular and/or fibrous substrate treated with the aqueous dispersion PG and then subjecting the granular and/or fibrous substrate thus treated to a drying step at a temperature T>Tg.

Processes for producing a shaped article from granular and/or fibrous substrates, fiber webs in particular, are familiar to a person skilled in the art. In these processes, shaped articles are generally produced by applying an aqueous binder system atop the granular and/or fibrous substrates or into the fiber webs, then optionally shaping the granular and/or fibrous substrate/fiber web thus treated and subsequently subjecting the granular and/or fibrous substrate/fiber web thus obtained to a thermal treatment step.

Binders used in the past for cost reasons frequently comprised formaldehyde-evolving crosslinkers. Recent binder systems do not evolve formaldehyde whether during the processing or during the use of the shaped articles obtained.

For instance U.S. Pat. No. 4,076,917 discloses binders which comprise carboxylic acid-containing or carboxylic anhydride-containing polymers and β-hydroxyalkylamides as crosslinkers. A disadvantage is the relatively costly and inconvenient preparation of the β-hydroxyalkylamides.

EP-A 445578 discloses boards made of finely divided materials, such as glass fibers, for example, in which mixtures of high molecular weight polycarboxylic acids and polyhydric alcohols, alkanolamines or polyfunctional amines act as binders.

EP-A 583086 discloses formaldehyde-free aqueous binders for producing fiber webs, more particularly glass fiber webs. The binders comprise a polycarboxylic acid having at least two carboxylic acid groups and also, optionally, anhydride groups, and a polyol. These binders require a phosphorus-containing accelerator in order to attain sufficient strengths on the part of the glass fiber webs. It is noted that the presence of such an accelerator is vital unless a reactive polyol is used. Highly reactive polyols specified include β-hydroxyalkylamides.

EP-A 651088 describes corresponding binders for substrates made from cellulosic fiber. These binders mandatorily comprise a phosphorus-containing reaction accelerant.

EP-A 672920 describes formaldehyde-free binding, impregnating or coating compositions which comprise at least one polyol and a polymer which is composed to an extent of 2 wt % to 100 wt % of an ethylenically unsaturated acid or acid anhydride comonomer. The polyols are substituted triazine, triazinetrione, benzene or cyclohexyl derivatives, and the polyol radicals are always located in positions 1, 3, and 5 of the aforementioned rings. In spite of a high drying temperature, the wet tensile strengths obtained with these binders on glass fiber webs are low.

DE-A 2214450 describes a copolymer composed of 80 wt % to 99 wt % of ethylene and 1 wt % to 20 wt % of maleic anhydride. Together with a crosslinking agent, the copolymer is used in powder form or in dispersion in an aqueous medium for the purpose of surface coating. The crosslinking agent used is a polyalcohol which contains amino groups. In order to bring about crosslinking, however, heating must be carried out at up to 300° C.

U.S. Pat. No. 5,143,582 discloses the production of heat-resistant nonwoven-web materials using a thermosetting heat-resistant binder. The binder is formaldehyde-free and is obtained by mixing a crosslinker with a polymer containing carboxylic acid groups, carboxylic anhydride groups or carboxylic salt groups. The crosslinker is a β-hydroxyalkylamide or a polymer or copolymer thereof. The polymer crosslinkable with the β-hydroxyalkylamide is synthesized, for example, from unsaturated monocarboxylic or dicarboxylic acids, salts of unsaturated monocarboxylic or dicarboxylic acids, or unsaturated anhydrides. Self-curing polymers are obtained by copolymerizing the β-hydroxyalkylamides with monomers comprising carboxyl groups.

US-A 2004/82689 discloses formaldehyde-free aqueous binders for producing fiber webs, more particularly glass fiber webs, said binders consisting essentially of a polymeric polycarboxylic acid, a polyol and an imidazoline derivative. The bonded fiber webs obtained are said to exhibit reduced water absorption. Both nitrogen-containing and nitrogen-free polyols are disclosed nonspecifically, although the nitrogen-containing triethanolamine in particular is described as preferred. Specific imidazoline derivatives mentioned include reaction products of a fatty acid with aminoethylethanolamine or diethylenetriamine. The aqueous binder compositions disclosed contain a phosphorus-containing accelerator.

WO 99/09100 discloses thermally curable compositions comprising, in addition to an alkanolamine having at least two OH groups, a polymer 1 and a further polymer 2 comprising respectively ≤5 wt % and ≥15 wt % of an α,β-ethylenically unsaturated mono- or dicarboxylic acid in polymerized form, and the use of said compositions as formaldehyde-free binders in the manufacture of shaped articles.

Furthermore WO 10/34645 discloses aqueous binder systems for granular and/or fibrous substrates, comprising as active constituents a polymer 1, comprising ≥5.5 wt % and ≤20 wt % of an α,β-ethylenically unsaturated mono- or dicarboxylic acid in polymerized form, a polymer 2, comprising ≥40 wt % of an α,β-ethylenically unsaturated mono- or dicarboxylic acid in polymerized form, and a polyol compound having at least two hydroxyl groups.

EP-A 1005508 discloses aqueous binders for granular and/or fibrous substrates consisting at least of a dispersion polymer comprising less than 5 wt % of acid monomers in polymerized form, an acid polymer comprising more than 40 wt % of acid monomers in a polymerized form, and an alkanolamine having at least two hydroxyl groups.

EP-A 1240205 discloses aqueous binders for granular and/or fibrous substrates comprising dispersion polymers obtained in the presence of a specific acid polymer by free-radically initiated aqueous emulsion polymerization.

EP-A 1448733 describes thermally curable aqueous binder systems comprising an emulsion polymer, an acid polymer, a mono- or multifunctional epoxy compound and also additionally a polyol or an alkanolamine having at least two hydroxyl groups.

EP-A 2328972 discloses aqueous binders for granular and/or fibrous substrates comprising as essential constituents a dispersion polymer comprising in polymerized form from 5.5 to 20 wt % of a carboxylic acid monomer; an acid polymer; and a polyol compound having at least two hydroxyl groups.

WO 2011/29810 describes dispersion polymers useful as binders for granular and/or fibrous substrates and mandatorily comprising acrylamide and/or methacrylamide, at least one ethylenically unsaturated mono- or dicarboxylic acid and at least one oxiranyl- or oxetanyl-containing monomer in polymerized form.

WO 2012/117017 describes binders for granular and/or fibrous substrates which in addition to a saccharide compound further comprise a specifically constructed dispersion polymer having a glass transition temperature in the range of ≥5 and ≤35° C.

WO 2010/86176 discloses a process for producing electrically conductive shaped articles wherein graphite oxide is dispersed in an aqueous medium with the aid of a dispersing assistant and then converted into an aqueous graphene dispersion by reduction, this aqueous graphene dispersion is mixed with an aqueous polymer dispersion to form a mixture, the water is removed from this mixture, then the remaining graphene-polymer mixture is heated until the dispersion polymer liquefies and the liquid mass obtained is brought into the desired shape and subsequently cooled down. The use of a graphene/dispersion polymer mixture as binder for granular and/or fibrous substrates is neither disclosed nor suggested.

WO 2011/144321 similarly discloses a process for producing electrically conductive shaped articles wherein an aqueous graphene dispersion is mixed with an aqueous polymer dispersion to form a mixture, the water is removed from this mixture, then the remaining graphene-polymer mixture is heated until the dispersion polymer liquefies and the liquid mass obtained is brought into the desired shape and subsequently cooled down. The use of a graphene/dispersion polymer mixture as binder for granular and/or fibrous substrates is neither disclosed nor suggested.

Existing processes for producing shaped articles from granular and/or fibrous substrates are disadvantageous in that the shaped articles obtained using known binders have very little electrical conductivity, if any. Yet electrical conductivity on the part of shaped articles is frequently advantageous in their production, their processing and/or their end use, as with antistatic floorcoverings for example.

The problem addressed by the present invention was therefore that of providing a process for producing shaped articles from granular and/or fibrous substrates which makes electrically conductive shaped articles available by using a specific binder system.

The problem was solved by the process defined at the beginning.

One essential component of the aqueous dispersion PG used in the process of the present invention is an aqueous polymer dispersion whose dispersion polymer has a glass transition temperature Tg.

An aqueous polymer dispersion in this context is a fluid system comprising polymer coils, consisting of a plurality of interentangled polymer chains, the so-called polymer matrix and/or polymer particles constructed of crosslinked polymer structures (the dispersion polymer) dispersely distributed as disperse phase in an aqueous medium. The average diameter of the dispersion polymer particles is generally in the range from 10 to 2000 nm.

Useful dispersion polymers for the purposes of the present invention include any naturally occurring and/or synthetically produced polymers that have a glass transition temperature Tg. Nitrocellulose, cellulose esters, rosin and/or shellac are examples of dispersion polymers based on natural products. Examples of synthetically produced dispersion polymers include polycondensation products, for example alkyd resins, polyesters, polyamides, silicone resins and/or epoxy resins and also polyaddition products, for example polyurethanes. Polyaddition products are preferably, however, chain growth addition polymers constructed of ethylenically unsaturated compounds in polymerized form. These polyaddition compounds are generally obtained by conventional metal complex catalyzed, anionically catalyzed, cationically catalyzed and—with particular preference—free-radically catalyzed polymerization of ethylenically unsaturated compounds.

The free-radically catalyzed polymerization of ethylenically unsaturated compounds is familiar to a person skilled in the art and is carried out, in particular, according to the method of free-radical bulk, emulsion, solution, precipitation or suspension polymerization, although the method of free-radically initiated aqueous emulsion polymerization is particularly preferable.

The conduct of free-radically initiated emulsion polymerizations of ethylenically unsaturated compounds (monomers) in an aqueous medium has been extensively described and therefore is well known to a person skilled in the art (cf. emulsion polymerization in Encyclopedia of Polymer Science and Engineering, Vol. 8, pages 659 if. (1987); D.C. Blackley, in High Polymer Latices, Vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Holscher, Springer-Verlag, Berlin (1969)]. A free-radically initiated aqueous emulsion polymerization is typically carried out by the monomers being dispersed, generally by use of dispersing assistants, such as emulsifiers and/or protective colloids, in an aqueous medium and polymerized using at least one water-soluble free-radical polymerization initiator. Frequently, the residual fractions of unconverted monomers in the aqueous polymer dispersions obtained are reduced using chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by diluting or concentrating, or the aqueous polymer dispersion has added to it further customarily added substances, for example foam- or viscosity-modifying additives. The only difference between this general procedure and that used to produce an aqueous polymer dispersion for use in the present invention is that, with the latter, the monomers are chosen such in terms of type and amount that the dispersion polymers that are formed have a glass transition temperature Tg. As will be appreciated in this connection, the procedure used to produce the dispersion polymers in the context of the present document shall also comprehend the seed, staged and gradient modes familiar to a person skilled in the art.

Useful monomers include in particular monomers that are free-radically polymerizable in a simple manner, examples being ethylene, vinylaromatic monomers, such as styrene, α-methylstyrene, o-chlorostyrene or vinyltoluenes, vinyl halides, such as vinyl chloride or vinylidene chloride, esters formed from vinyl alcohol and monocarboxylic acids of 1 to 18 carbon atoms, such as vinyl acetate, vinyl propionate, vinyl n-butyrate, vinyl laurate and vinyl stearate, esters formed by preferably 3 to 6 carbon atom α,β-monoethylenically unsaturated mono- and dicarboxylic acids, especially acrylic acid, methacrylic acid, maleic acid, fumaric acid and itaconic acid, combining with alkanols of generally 1 to 12, preferably 1 to 8 and especially 1 to 4 carbon atoms, particularly methyl acrylate, ethyl acrylate, butyl acrylate, isobutyl acrylate, pentyl acrylate, hexyl acrylate, heptyl acrylate, octyl acrylate, nonyl acrylate, decyl acrylate, 2-ethylhexyl acrylate, methyl methacrylate, ethyl methacrylate, n-butyl methacrylate, isobutyl methacrylate, pentyl methacrylate, hexyl methacrylate, heptyl methacrylate, octyl methacrylate, nonyl methacrylate, decyl methacrylate, 2-ethylhexyl methacrylate, dimethyl fumarate, dimethyl maleate, dibutyl fumarate, or dibutyl maleate, nitriles of $\alpha,\beta$-monoethylenically unsaturated carboxylic acids, such as acrylonitrile, methacrylonitrile, fumaronitrile, maleonitrile, and also $C_{4-8}$-conjugated dienes, such as 1,3-butadiene and isoprene. The monomers referred to generally constitute the main monomers which, based on the amount of all ethylenically unsaturated compounds used for preparing the dispersion of polymer (i.e., based on total monomers), comprise a proportion ≥50 wt %, preferably ≥80 wt % and more preferably ≥90 wt %. These monomers generally merely have a moderate to low solubility in water under standard conditions [20° C., 1 atm (=1.013 bar absolute)].

Monomers that do have an increased level of solubility in water under the aforementioned conditions comprise either at least one acid group and/or the corresponding anion thereof, and/or at least one amino, amido, ureido or N-heterocyclic group and/or ammonium derivatives thereof with alkylation or protonation on the nitrogen. Examples include $\alpha,\beta$-monoethylenically unsaturated mono- and dicarboxylic acids and amides thereof, for example acrylic acid, methacrylic acid, maleic acid, fumaric acid, itaconic acid, acrylamide and methacrylamide, further vinylsulfonic acid, 2-acrylamido-2-methylpropanesulfonic acid, styrenesulfonic acid and water-soluble salts thereof and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino) ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. Normally, the aforementioned monomers are merely present as modifying monomers in amounts ≤10 wt % and preferably ≤5 wt %, based on total monomers.

Monomers that typically enhance the integrity of films formed by the polymer matrix normally have at least one epoxy, hydroxyl, N-methylol or carbonyl group or at least two nonconjugated ethylenically unsaturated double bonds. Examples thereof are monomers comprising two vinyl radicals, monomers comprising two vinylidene radicals and also monomers comprising two alkenyl radicals. Of particular advantage here are the diesters of dihydric alcohols with $\alpha,\beta$-monoethylenically unsaturated monocarboxylic acids, of which acrylic acid and methacrylic acid are preferable. Examples of such monomers comprising two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Also of particular importance in this connection are the $C_1$-$C_8$ hydroxyalkyl esters of methacrylic acid and of acrylic acid such as n-hydroxyethyl acrylate, n-hydroxyethyl methacrylate, n-hydroxypropyl acrylate, n-hydroxypropyl methacrylate, n-hydroxybutyl acrylate and n-hydroxybutyl methacrylate, and also compounds such as diacetoneacrylamide and acetylacetoxyethyl acrylate/methacrylate. The aforementioned monomers are frequently employed in amounts ≤5 wt % but preferably in amounts ≤3 wt %, both based on total monomers.

It is advantageous for the purposes of the present invention to use aqueous polymer dispersions whose dispersion polymers comprise ≥50 and ≤99.9 wt % of esters of acrylic and/or methacrylic acids with alkanols of 1 to 12 carbon atoms and/or styrene, or ≥40 and ≤99.9 wt % of styrene and/or butadiene, or ≥50 and ≤99.9 wt % of vinyl chloride and/or vinylidene chloride, or ≥40 and ≤99.9 wt % of vinyl acetate, vinyl propionate and/or ethylene in polymerized form.

It is particularly advantageous for the purposes of the present invention to employ aqueous polymer dispersions whose disperse polymers comprise ≥0.1 and ≤5 wt % of at least one 3 to 6 carbon atom $\alpha,\beta$-monoethylenically unsaturated mono- and/or dicarboxylic acid and/or amide thereof, and ≥50 and ≤99.9 wt % of at least one of acrylic and/or methacrylic acids with alkanols of 1 to 12 carbon atoms and/or styrene, or ≥0.1 and ≤5 wt % of at least one 3 to 6 carbon atom $\alpha,\beta$-monoethylenically unsaturated mono- and/or dicarboxylic acid and/or amide thereof, and ≥40 and ≤99.9 wt % of styrene and/or butadiene, or ≥0.1 and ≤5 wt % of at least one 3 to 6 carbon atom $\alpha,\beta$-monoethylenically unsaturated mono- and/or dicarboxylic acid and/or amide thereof, and ≥50 and ≤99.9 wt % of vinyl chloride and/or vinylidene chloride, or ≥0.1 and ≤5 wt % of at least one 3 to 6 carbon atom $\alpha,\beta$-monoethylenically unsaturated mono- and/or dicarboxylic acid and/or amide thereof, and ≥40 and ≤99.9 wt % of vinyl acetate, vinyl propionate and/or ethylene in polymerized form.

A free-radically initiated aqueous emulsion polymerization for preparing the dispersion polymers is generally carried out in the presence of 0.1 to 5 wt %, preferably 0.1 to 4 wt % and especially 0.1 to 3 wt %, all based on total monomers, of a free-radical polymerization initiator. Any free-radical polymerization initiator capable of initiating a free-radical aqueous emulsion polymerization may be used. Peroxides and azo compounds may both be concerned here in principle. Redox initiator systems, as will be appreciated, may also be used. Useful peroxides include in principle inorganic peroxides, such as hydrogen peroxide or peroxodisulfates, such as the mono- or di-alkali metal or ammonium salts of peroxodisulfuric acid, for example the mono- and di-sodium, -potassium or ammonium salts thereof, or organic peroxides, such as alkyl hydroperoxides, for example tert-butyl, p-mentyl or cumyl hydroperoxide, and also dialkyl or diaryl peroxides, such as di-tert-butyl or dicumyl peroxide. The azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). So-called redox initiator systems, as will be appreciated, may also be used as free-radical polymerization initiators. The oxidizing agents for redox initiator systems are essentially selected from the abovementioned peroxides. The corresponding reducing agents may be sulfur compounds of low oxidation state, such as alkali metal sulfides, for example potassium and/or sodium sulfites, alkali metal hydrogensulfites, for example potassium and/or sodium hydrogensulfites, alkali metal metabisulfites, for example potassium and/or sodium metabisulfites, formaldehyde sulfoxylates, for example potassium and/or sodium formaldehyde sulfoxylate, alkali metal salts, specifically potassium and/or sodium salts, of aliphatic sulfinic acids and alkali metal hydrogensulfides, for example potassium and/or sodium hydrogensulfides, salts of polyvalent metals, such as iron(II) sulfate, iron(II) ammoniosulfate, iron(II) phosphate, enediols, such as dihydroxymaleic acid, benzoin and/or ascorbic acid, and also reducing saccharides, such as sorbose, glucose, fructose and/or dihydroxyacetone.

Dispersing assistants are typically also used in the preparation of dispersion polymers by free-radically initiated aqueous emulsion polymerization to ensure disperse distribution in the aqueous phase not only of the monomer droplets but also of the polymer corpuscles and thus ensure that the resulting aqueous dispersions of the dispersion polymers are stable. Dispersing assistants to be considered for use include protective colloids of the kind typically used for conducting free-radical aqueous emulsion polymerizations as well as emulsifiers.

Suitable protective colloids include, for example, polyvinyl alcohols, cellulose derivatives or vinylpyrrolidone-containing copolymers. An exhaustive description of further suitable protective colloids is found in Houben-Weyl, Methoden der organischen Chemie, volume XIV/1, Makromolekulare Stoffe, pages 411 to 420, Georg-Thieme-Verlag, Stuttgart, 1961. It will be appreciated that mixtures of emulsifiers and/or protective colloids may also be used. The dispersing assistants used are preferably all emulsifiers whose relative molecular weights are typically below 1000, in contradistinction to protective colloids. Emulsifiers may be not only anionic or cationic but also nonionic. It will be appreciated that when mixtures of surface-active substances are used, the individual components need to be compatible with each other, as may be verified in cases of doubt by performing a few preliminary tests. The general rule is that anionic emulsifiers are compatible with each other and with nonionic emulsifiers. The same holds for cationic emulsifiers, whereas anionic and cationic emulsifiers are usually incompatible with each other. Customary emulsifiers include, for example, ethoxylated mono-, di- and trialkylphenols (degree of ethoxylation: 3 to 50, alkyl size: C4 to C12), ethoxylated fatty alcohols (degree of ethoxylation: 3 to 50; alkyl size: C8 to C36) and also alkali metal and ammonium salts of alkylsulfates (alkyl size: C8 to C12), of sulfuric monoesters of ethoxylated alkanols (degree of ethoxylation: 4 to 30, alkyl size: C12 to C18) and of ethoxylated alkylphenols (degree of ethoxylation: 3 to 50, alkyl size: C4 C12), of alkylsulfonic acids (alkyl size: C12 to C18) and of alkylarylsulfonic acids (alkyl size: C9 to C18). Suitable emulsifiers are further found in Houben-Weyl, Methoden der organischen Chemie, volume XIV/1, Makromolekulare Stoffe, pages 192 to 208, Georg-Thieme-Verlag, Stuttgart, 1961.

Suitable surface-active substances further include compounds of general formula I

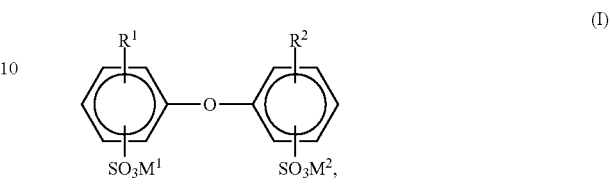

where $R^1$ and $R^2$ are each an H atom or $C_4$ to $C_{24}$ alkyl but may not both be an H atom, and $M^1$ and $M^2$ may be alkali metal ions and/or ammonium ions. $R^1$ and $R^2$ in general formula (I) are preferably linear or branched alkyl radicals of 6 to 18 carbon atoms, in particular 6, 12 and 16 carbon atoms, or hydrogen, with the proviso that $R^1$ and $R^2$ may not both be an H atom. $M^1$ and $M^2$ are preferably sodium, potassium or ammonium, of which sodium is particularly preferable. Particularly advantageous compounds (I) have $M^1$ and $M^2$ both sodium, $R^1$ a branched alkyl of 12 carbon atoms and $R^2$ an H atom or $R^1$. Technical-grade mixtures frequently used comprise from 50 to 90 wt % of the monoalkylated product, for example Dowfax® 2A1 (trademark of Dow Chemical Company). Compounds (I) are commonly/generally known, for example from U.S. Pat. No. 4,269,749, and are commercially available.

It is advantageous to use nonionic and/or anionic dispersing assistants in the preparation of dispersion polymers by free-radically initiated aqueous emulsion polymerization. However, cationic dispersing assistants may also be used.

The amount of dispersing assistant used is generally in the range from 0.1 to 5 wt %, preferably from 1 to 3 wt %, all based on total monomers. It is frequently advantageous for all or some of the dispersing assistant to be added to the aqueous reaction medium prior to the initiation of the free-radical polymerization. Some or all of the dispersing assistant may further be added to the aqueous reaction medium during the polymerization, advantageously even together with the monomers, especially in the form of an aqueous monomer emulsion.

Chain transfer agents are typically used in order to reduce/police the molecular weight of polymers A obtainable via a free-radically initiated aqueous emulsion polymerization. Chain transfer agents used in this context include essentially aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thiocompounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols, such as benzenethiol, ortho-, meta- or para-methylbenzenethiol, and also any further sulfur compounds described in the Polymer Handbook 3rd edition, 1989, J. Brandrup and E. H. Immergut, John Weley & Sons, section II, pages 133 to 141, but also aliphatic and/or aromatic aldehydes, such as acetaldeyhde, propionaldehyde and/or benzaldehyde, unsaturated fatty acids, such as oleic acid, dienes having nonconjugated double bonds, such as divinylmethane or vinylcyclohexane or hydrocarbons having easily abstracted hydrogen atoms, for example toluene. But it is also possible to use mixtures of nondisruptive aforementioned chain transfer agents.

The total amount of chain transfer agents which is optionally used in the preparation of dispersion polymers by free-radically initiated aqueous emulsion polymerization is generally <5 wt %, often <3 wt % and frequently <1 wt %, all based on total monomers.

The emulsion polymerization for preparing the dispersion polymers may be carried out without a seed but to control the polymer corpuscle size it may also be carried out by the seed latex processes or in the presence of a seed latex prepared in situ. Processes for this purpose are known to a person skilled in the art and may be taken from the prior art (see for example EP-B 40 419, EP-A 567 812, EP-A 614 922 and also 'Encyclopedia of Polymer Science and Technology', Vol. 5, page 847, John Wiley & Sons Inc., New York, 1966). The prior art recommendation in the case of a semi-continuous feed stream addition process is to place a defined finely divided seed polymer dispersion in the polymerization vessel as initial charge and then to polymerize the monomers in the presence of the seed latex. The seed polymer corpuscles here act as "polymerization nuclei" and delink the polymer corpuscle formation and the polymer corpuscle growth stages. During the emulsion polymerization, further seed latex may be admixed directly into the polymerization reactor. Broad size distributions are thereby achieved for the polymer corpuscles, as are often desirable for high-solids polymer dispersions in particular (cf. for example DE-A 4213965). Instead of admixing a defined seed latex, the latter may also be produced in situ. To this end, for example, a portion of the monomers used for the polymerization and of the free-radical polymerization initiator is initially charged together with all or some of the emulsifier and heated to reaction temperature to form a relatively finely divided polymer seed. The actual polymerization is then carried out in the same polymerization vessel by the feed stream addition process (see also DE-A 4213965).

The dispersion polymers are advantageously obtained by free-radically initiated aqueous emulsion polymerization at a reaction temperature in the range from 0 to 170° C., although temperatures from 70 to 120° C. and especially 80 to 100° C. are particularly preferable. The free-radical aqueous emulsion polymerization may be carried out at a pressure below, equal to or above 1 atm (absolute). Volatile monomers such as ethylene, butadiene or vinyl chloride are preferably polymerized under elevated pressure. The pressure may in fact be 1.2, 1.5, 2, 5, 10 or 15 bar (superatmospheric) or may assume still higher values. Pressure settings for emulsion polymerizations under reduced pressure are 950 mbar, frequently 900 mbar and often 850 mbar (absolute). The free-radical aqueous emulsion polymerization is advantageously carried out at 1 atm (=atmospheric pressure) under inert gas blanketing, as under nitrogen or argon for example.

The aqueous reaction medium in the case of the free-radically initiated aqueous emulsion polymerization may also in principle comprise minor amounts (<5 wt %) of water-soluble organic solvents, for example methanol, ethanol, isopropanol, butanols, pentanols, but also acetone etc. Preferably, however, the free-radically initiated aqueous emulsion polymerization is carried out without such solvents.

The dispersion polymers employed for the purposes of the present invention may in principle have glass transition temperatures Tg in the range of ≥−10 and ≤100° C. The dispersion polymers have with advantage a glass transition temperature Tg in the range of ≥10 and ≤80° C. and advantageously in the range ≥15 and ≤60° C. Glass transition temperature Tg in the context of this document is to be understood as referring to the midpoint temperature of ASTM D 3418-12, as determined by differential scanning calorimetry (DSC; 20 K/min) [cf. also Ullmann's Encyclopedia of Industrial Chemistry, page 169, Verlag Chemie, Weinheim, 1992 and Zosel in Farbe and Lack, 82, pages 125 to 134, 1976].

It is further important that following Fox (T.G. Fox, Bull. Am. Phys. Soc. 1956 [Ser. II] 1, page 123 and according to Ullmann's Encyclopädie der technischen Chemie, vol. 19, page 18, 4$^{th}$ edition, Verlag Chemie, Weinheim, 1980) the glass transition temperature of not more than but lightly crosslinked interpolymers may be estimated to good approximation by the following equation:

$1/Tg = x_1/Tg_1 + x_2/Tg_2 + \ldots x_n/Tg_n,$ where $x_1, x_2, \ldots x_n$ are the mass fractions of monomers 1, 2, ... n and $Tg_1, Tg_2, \ldots Tg_n$ are the glass transition temperatures in degrees Kelvin of the respective homopolymers constructed of just one of the monomers 1, 2, ... n. The glass transition temperatures of these homopolymers of most ethylenically unsaturated monomers are known (and/or are simple to determine experimentally in a conventional manner) and for example itemized in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

The polymer solids content of the aqueous dispersion of polymers obtainable by emulsion polymerization in the form of their aqueous dispersions is typically ≥10 and ≤70 wt %, frequently ≥20 and ≤65 wt % and often ≥25 and ≤60 wt %, all based on the aqueous polymer dispersion.

It is particularly advantageous for the dispersion polymers to be in the form of corpuscles having an average corpuscle diameter ≥10 and ≤1000 nm, advantageously ≥30 and ≤600 nm and more advantageously ≥50 to ≤400 nm, as determined by the method of quasi elastic light scattering (ISO standard 13 321; cumulant z-average).

It will be appreciated that aqueous dispersions of dispersion polymer can in principle also be prepared in the form of so-called secondary polymer dispersions (regarding the in-principle preparation of secondary polymer dispersions see for example Eckersley et al., Am. Chem. Soc., Div. Polymer Chemistry, 1977, 38(2), pages 630, 631, U.S. Pat. No. 3,360,599, U.S. Pat. No. 3,238,173, U.S. Pat. No. 3,726,824, U.S. Pat. No. 3,734,686 or U.S. Pat. No. 6,207, 756). These secondary aqueous dispersions are generally prepared by the dispersion polymers obtained by the method of bulk or solution polymerization being dissolved in a suitable organic solvent and dispersed in an aqueous medium to form aqueous polymer/solvent (mini)emulsions.

Subsequent solvent removal leaves the corresponding aqueous dispersions of dispersion polymer.

The process of the present invention is accordingly advantageously carried out with aqueous polymer dispersions whose dispersion polymers have an average corpuscle diameter ≥10 and ≤1000 nm, advantageously ≥30 and ≤600 nm and more advantageously ≥50 to ≤400 nm.

It is particularly advantageous for the process of the present invention to utilize an aqueous polymer dispersion whose polymer is constructed from ≥10.0 and ≤20.0 wt % of n-butyl acrylate
≥0 and ≤5.0 wt % of N-methylolacrylamide
≥45.0 and ≤60.0 wt % of ethyl acrylate
≥0 and ≤5.0 wt % of acrylamide and/or methacrylamide
≥20.0 and ≤40.0 wt % of acrylonitrile and/or methacrylonitrile, where the utilized amounts sum to 100 wt %, in polymerized form, has a glass transition temperature Tg≥20 and ≤45° C. and whose average corpuscle diameter is ≥100 and ≤400 nm.

An aqueous graphene dispersion is a further essential constituent of aqueous dispersion PG.

Graphene as understood in the art is a monolayer of carbon atoms in a two-dimensional honeycomb structure (hexagonal ring structure). In the context of the present invention, however, the term "graphene" is not solely restricted to the carbon honeycomb structure that consists of a monolayer, but also comprehends, in conformity with a multiplicity of publications and with the product specifications of many graphene manufacturers for their graphene, a carbon material that consists of a mixture of corresponding carbon monolayers, layered agglomerates of two superposed carbon monolayers (two-layer product) and layered agglomerates of three to ten and sometimes even up to twenty carbon monolayers ("few layer graphene"). The ratio of separate carbon monolayers to agglomerates of two or more carbon monolayers is greatly dependent on the manufacturing process and/or the supplier. In the context of the present invention, the material called "graphene" is characterized in that it preferably has no graphite signal in the x-ray diffraction diagram. The presence of graphitic fractions is characterized by a peak at a diffraction angle 2theta in the range 25 to 30° (exact value: 26.3°; with Cu Kα radiation; wavelength 0.154 nm). Frequently, however, a broad signal is measured because the carbon monoplies in the graphene have different interlayer spacings. The presence of a signal in this range is indicative of some incompleteness of exfoliation, while the intensity of this signal makes it possible to determine the extent of exfoliation, i.e., the extent to which carbon monolayers are present.

"Graphene" within the meaning of the present invention is likewise characterized by a low bulk density, which is in the range ≤0.2 g/cm³, for example in the range ≥0.001 and ≤0.2 g/cm³ or ≥0.003 and ≤0.2 g/cm³, advantageously in the range ≤0.15 g/cm³, for example in the range ≥0.001 and ≤0.15 g/cm³ or ≥0.003 and ≤0.15 g/cm³, more advantageously in the range ≤0.1 g/cm³, for example in the range ≥0.001 and ≤0.1 g/cm³ or ≥0.003 and ≤0.1 g/cm³, with particular advantage in the range ≤0.05 g/cm³, for example in the range ≥0.001 and ≤0.05 g/cm³ or ≥0.003 and ≤0.05 g/cm³, and with especial advantage in the range ≤0.01 g/cm³, for example in the range ≥0.001 and ≤0.01 g/cm³ or ≥0.003 and ≤0.01 g/cm³.

"Graphene" within the meaning of the present invention is further characterized by a very high BET surface area (Brunauer-Emmett-Teller surface area), which is in the range ≥200 m²/g, for example in the range ≥200 and ≤2600 m²/g or ≥200 and ≤2000 m²/g or ≥200 and ≤1500 m²/g or ≥200 and ≤700 m²/g and advantageously in the range ≥300 m²/g, for example in the range ≥300 and ≤2600 m²/g or ≥300 and ≤2000 m²/g or ≥300 and ≤1500 m²/g or ≥300 and ≤700 m²/g.

"Graphene" within the meaning of the present invention is advantageously characterized by a high ratio of carbon atoms to oxygen atoms (C/O ratio). The C/O ratio reflects the extent of the reduction reaction preceding from graphite oxide, the commonly used starting material for the production of graphene. The C/O ratio is at least ≥3, preferably ≥5, more preferably ≥50, yet more preferably ≥100 and most preferably ≥500, all determined from the atom contents in % with regard to carbon and oxygen by x-ray photoelectron spectroscopy.

Graphene that is employable for the purposes of the present invention and its method of making are described for example in Macromolecules 2010, 43, pages 6515 to 6530, in WO 2009/126592, in J. Phys. Chem. B 2006, 110, pages 8535 to 8539, in Chem. Mater. 2007, 19, pages 5396 to 4404, in American Chemical Society Nano 2008, 2 (3), pages 463 to 470, in Nano Letters 2010, 10 (12), pages 4863 to 4868, and also in the cited literature.

The amount of graphene used for the purposes of the present invention is in the range of ≥0.01 and ≤20 parts by weight, advantageously ≥0.1 and ≤15 parts by weight and more advantageously ≥0.5 and ≤10 parts by weight per 100 parts by weight of dispersion polymer.

Aqueous dispersion PG is advantageously obtained by mixing an aqueous polymer dispersion with the corresponding amount of an aqueous graphene dispersion. This is advantageously done in a temperature range ≥10 and ≤40° C. by initially charging the entire amount of the aqueous polymer dispersion and gradually adding the aqueous graphene dispersion to the initial charge under homogeneous mixing. Care must be taken here in particular that the components of the aqueous polymer dispersion (essentially the dispersion polymer and dispersing assistants, such as surfactants or protective colloids) be mutually compatible with the components of the aqueous graphene dispersion (essentially graphene and dispersing assistants) and do not enter disruptive reactions, such as coagulation in particular, therewith.

A person skilled in the art will know how to prepare an aqueous graphene dispersion, for example in situ by reduction of graphite oxide in an aqueous graphite oxide dispersion, as disclosed for example in Nature Nanotechnology 3, pages 101 to 105 and also WO 2010/86176 or WO 2011/144321. It will be appreciated that it is also possible to disperse pulverulent graphene in an aqueous surfactant or protective colloid solution under agitation by ultrasonication. The graphene dispersions thus obtained and used for producing the aqueous dispersions PG generally have a graphene content in the range ≥0.001 and ≤10.0 wt %, advantageously in the range ≥0.01 and ≤5.0 wt % and more advantageously in the range ≥0.1 and ≤3.0 wt %, all based on the aqueous graphene dispersion.

Accordingly, the present invention also has an embodiment comprising the use of an aqueous dispersion PG, prepared from a) an aqueous polymer dispersion whose dispersion polymer has a glass transition temperature Tg, and
b) an aqueous graphene dispersion, wherein the weight fraction of graphene is ≥0.01 and ≤20 parts by weight per 100 parts by weight of dispersion polymer (solids/solids), as binder for granular and/or fibrous substrates.

It will be appreciated that the aqueous dispersion PG herein may comprise still further, customary auxiliary materials of the type which is familiar, in species and amount, to a person skilled in the art, examples being dyes, optical brighteners, retention aids, wetting agents, defoamers, preservatives, slimicides, plasticizers, anti-blocking agents, antistats, hydrophobicizing agents, etc.

Granular and/or fibrous substrates are familiar to a person skilled in the art. In principle any organic or inorganic natural and/or synthetic granular and/or fibrous compounds whose longest dimension is ≤10 mm, preferably ≤5 mm and specifically ≤1 mm in the case of granular substrates and whose largest diameter is ≤1 mm, preferably ≤0.1 mm and specifically ≤0.05 mm in the case of fibrous substrates can be used in the invention.

Granular substrates may comprise for example white or colored pigmentary compounds, in particular titanium dioxide, zinc oxide, zinc sulfide, iron oxide, cadmium oxide, chromium oxide, lead oxide, iron sulfide, cadmium sulfide, chromium sulfide, lead sulfide and also lead molybdates or cobalt blue, or fillers (refractive index values <1.7), for example the naturally occurring fillers calcite, chalk, dolomite, kaolin, talc, mica, diatomaceous earth, barite or the synthetically produced fillers precipitated calcium carbonate or barium sulfate and also pyrogenous silica.

Fibrous substrates comprise natural fibers, such as vegetable, animal and mineral fibers, or manufactured fibers composed of natural or synthetic polymers. Examples of vegetable fibers are cotton fibers, flax fibers, hemp fibers, kenaf fibers, jute fibers, wood fibers or sisal fibers. Examples of animal fibers are wool or other animal hairs, and an example of mineral fibers is rock wool, an example of manufactured fibers with a natural origin is viscose fiber and examples of manufactured fibers based on synthetic polymers are polyester fibers, such as polytrimethylene terephthalate, polyethylene naphthalate, polyethylene terephthalate or polybutylene terephthalate fibers and also the various polycarbonate fibers, polyolefin fibers, in particular polyethylene or polypropylene fibers, polyamide fibers, such as polycaprolactam fibers (nylon-6), polyamide fibers from hexamethylenediamine and adipic acid (nylon-6,6), polyamide fibers from hexamethylenediamine and terephthalic acid (nylon-6,T), polyamide fibers from paraphenylenediamine and terephthalic acid (aramid) and also mineral fibers, such as glass fibers, carbon fibers or basalt fibers.

It will be appreciated that the term substrate in the context of the present document advantageously also comprehends the webs obtainable from fibers, for example so-called mechanically consolidated, specifically needled, fiber webs or chemically prebonded fiber webs.

In the context of the present document, a fiber web is to be understood as meaning a sheetlike fibrous layer wherein fibers of finite length, continuous-filament fibers or yarns of any kind and any origin have been combined into a web and somehow joined together, in particular by mechanical consolidation or chemical prebonding.

The present invention employs with particular advantage fiber webs constructed of lignocellulosic fibers, such as cotton fibers, flax fibers, hemp fibers, kenaf fibers, jute fibers, wood fibers and/or sisal fibers or mixtures thereof with thermoplastic polymeric fibers, such as polyester or polyolefin fibers, or glass fiber webs.

Fiber webs useful for the purposes of the present invention generally have a basis weight of ≥10 and ≤3000 g/m², advantageously of ≥40 and ≤2000 g/m² and more advantageously of ≥50 and ≤1400 g/m².

It is an essential requirement of the process that the aqueous dispersion PG be applied uniformly atop the surface of the fibrous and/or granular substrate (or introduced into the fiber web). The amount of aqueous dispersion PG for this is chosen such that ≥1 g and ≤100 g, preferably ≥2 g and ≤50 g and more preferably ≥5 g and ≤30 g, of binder (reckoned as summed total amounts of dispersion polymer and graphene solids) are used per 100 g of granular and/or fibrous substrate. A person skilled in the art is familiar with applying the aqueous dispersion PG atop the granular and/or fibrous substrate, specifically fiber web, for example by drenching or by spraying the granular and/or fibrous substrate.

After the aqueous dispersion PG has been applied atop the granular and/or fibrous substrate, the granular and/or fibrous substrate which has been treated with the aqueous dispersion PG is optionally shaped and then the granular and/or fibrous substrate thus treated is subjected to a drying step at a temperature T that is higher than the glass transition temperature $T_g$ of the dispersion polymer ($T>T_g$).

The drying step is advantageously carried out at a temperature $T \geq T_g+5°$ C. and more advantageously at a temperature $T \geq T_g+20°$ C. To achieve short drying times, distinctly higher temperatures may also be used, for example $T_g+50°$ C. or $T_g+100°$ C. or even $T_g+150°$ C. The drying step here is generally carried on to constant shaped article weight.

In one embodiment, the shaped articles obtainable by the process according to the invention shall also be comprehended.

Shaped articles obtainable by the process according to the present invention are very useful as component elements in vehicle construction, for example as door inserts, door trim supports, knee protectors, glove compartments, trunk linings or seat back trim, in built structures, for example as room dividers, partitioning walls or ceiling panels and furniture such as, for example, as seat or back areas.

The shaped articles obtained by the process according to the present invention, such as consolidated fiber webs in particular, advantageously possess electrical conductivity, and therefore they can be produced and/or further processed, for example in the manufacture of bituminized roofing membranes, whilst avoiding any disruptive electrostatic charge buildup.

The examples which follow are nonlimiting and illustrate the invention.

EXAMPLES

The aqueous polymer dispersion used was a 51 wt % aqueous polymer dispersion whose polymer was constructed from 18 wt % of n-butyl acrylate, 50 wt % of ethyl acrylate, 25 wt % of acrylonitrile, 4 wt % of acrylamide and 3 wt % of N-methylolacrylamide in polymerized form and had a glass transition temperature of 30° C. (midpoint temperature of ASTM D 3418-12, as determined by differential scanning calorimetry; heating rate 20 K/min) and the average corpuscle size of which was 310 nm (as determined to ISO standard 13 321; cumulant z-average).

To produce the graphene-containing aqueous polymer dispersion, 24.525 parts by weight of deionized water, 0.225 part by weight of Tamol® NN 9401 (sales product of BASF SE) and 0.168 part by weight of graphene were initially charged in a mixing vessel at room temperature (20 to 25° C.) and the graphene was dispersed by 10-minute ultrasonication (UP 400 S H 7 ultrasonicator) with cooling. This was followed by adding 5.082 parts by weight of the aforementioned aqueous polymer dispersion and the mixture obtained was mixed homogeneous. The mixture obtained was adjusted to a total solids content of 3.7 wt % by diluting with deionized water. The mixture obtained is hereinafter referred to as binder liquor B1.

The aforementioned aqueous polymer dispersion itself was also diluted to a solids content of 3.7 wt % with deionized water. The dilute aqueous polymer dispersion obtained is hereinafter referred to as binder liquor V.

Performance Testing

To produce bonded fiber webs, the base web used was a glass fiber web (28.5 cm in length and 27 cm in width) with a basis weight of 53 g/m² from Whatman International Ltd, Springfield Mill, James Whatman Way, Maidstone, Kent ME14 2LE England.

To apply the aqueous binder liquors (impregnation), the glass fiber webs were passed in the longitudinal direction, on an endless PES foramanous belt, at a belt speed of 2.0 m per minute, through respectively the aforementioned 3.7 wt % aqueous binder liquors B1 and V. The aqueous binder liquors were subsequently sucked off to adjust the wet pickup to 286 g/m² (corresponding to 10.6 g/m² of binder reckoned as solids). The impregnated glass fiber webs thus obtained were dried/cured in a Mathis oven on a plastics mesh as support at 180° C. in a maximal hot air stream for 3 minutes. After cooling down to room temperature, test strips measuring 240×50 mm were cut out in the fiber longitudinal direction. The test strips obtained were subsequently conditioned for 24 hours at 23+ C. and 50% relative humidity (standard conditions) in a conditioning room. The glass fiber web test strips obtained are hereinbelow referred to as test strips B1 and V, in correspondence with the employed binder liquors B1 and V.

Determination of Dry Breaking Strength

Dry breaking strength was determined at room temperature on a Z005 tensile tester from Zwick-Roell. Test strips B1 and V were clamped vertically into a tensioning device such that the free clamped length was 200 mm. Thereafter, the clamped test strips were pulled apart in the opposite direction at a speed of 10 mm per minute until the test strips broke. Dry breaking strength is reported in newtons per 50 mm after standardization to 64 g/m². The higher the force needed to break the strips, the better the corresponding breaking strength. Five measurements were carried out in each case. The values reported in table 1 each represent the average value of these measurements.

Determination of Wet Breaking Strength

To determine their wet breaking strength, the test strips were kept in deionized water at 80° C. for 15 minutes and thereafter excess water was dabbed off with a woven cotton fabric. Wet breaking strength was determined on a Z005 tensile tester from Zwick-Roell. Test strips B1 and V were clamped vertically into a tensioning device such that the free clamped length was 200 mm. Thereafter, the clamped test strips were pulled apart in the opposite direction at a speed of 10 mm per minute until the test strips broke. The higher the force needed to break the strips, the better the corresponding breaking strength. Five separate measurements were carried out in each case. The values reported in table 1 each represent the average value of these measurements.

Determination of Hot Breaking Strength

Hot breaking strength was determined on a Z010 tensile tester from Zwick-Roell whose tensioning device was located in a heatable chamber. Test strips B1 and V were clamped vertically in the preheated chamber at 180° C. into a tensioning device such that the free clamped length was 100 mm. After 1 minute waiting time at 180° C. the clamped test strips were pulled apart in the opposite direction at a speed of 25 mm per minute until the test strips broke. The higher the force needed to break the strips, the better the corresponding breaking strength. Five separate measurements were carried out in each case. The values reported in table 1 each represent the average value of these measurements.

TABLE 1

Breaking strength dry, wet and hot

| Test strip | V | B1 |
|---|---|---|
| | [data in N/5 cm, weight corrected to 64 g/m²] | |
| dry breaking strength | 62.0 | 62.2 |
| wet breaking strength | 9.6 | 10.7 |
| hot breaking strength | 21.6 | 32.4 |

Determination of Flexural Stiffness

The aforementioned glass fiber webs bonded with binder liquors B1 and V and cooled down were die cut to cut out in each case 10 test strips 70×30 mm in the machine and cross directions of the web. The test strips obtained were then stored under standard conditions for 24 hours.

Flexural strength was determined using a type Z 2.5 tester from Zwick-Roell. The aforementioned test strips were clamped into the sample holder and flexed with a measured length of 10 mm over the edge of the force sensor at a speed of 6° per second up to a deformation of 30° while the maximum force applied was determined (in mN). The test was carried out in the machine and cross directions for each of 5 test specimens. The higher the maximum force needed, the better the corresponding flexural stiffness. The values reported in table 2 represent the average value of the respective 5 individual measurements.

TABLE 2

Flexural stiffnesses in machine and cross directions

| Test strip flexural stiffness | V | B1 |
|---|---|---|
| | [data in mN] | |
| in MD | 107 | 114 |
| in XD | 86 | 93 |

Electrical Properties of Graphene-Containing Glass Fiber Web

A 28.5×27 cm glass fiber web impregnated with binder liquor B1, dried and cured was subjected to a determination of the sheet resistance using a Loresta GP instrument from Mitsubishi and an ESP probe.

To this end, the sheet resistance and the corresponding layer thicknesses were determined at five different places (center and also top center, bottom center, center right and center left, each 2 cm from the edge) of the impregnated 28.5×27 cm glass fiber web and used to determine the averaged sheet resistance and the average value of the specific conductivity. In fact, the averaged sheet resistance was found to be $6.8 \times 10^4$ ohms and the average value found for the specific conductivity was $1.1 \times 10^{-3}$ S/cm.

We claim:

1. A process for producing a shaped article from a substrate, the process comprising:
 applying an aqueous dispersion PG to the substrate to form a treated substrate, wherein the aqueous dispersion PG is obtained from a) an aqueous polymer dispersion comprising a dispersion polymer which has a glass transition temperature Tg, and
b) an aqueous graphene dispersion,
wherein the weight fraction of graphene is ≥0.01 and ≤20 parts by weight per 100 parts by weight of the dispersion polymer (solids/solids), and
drying the treated substrate at a drying temperature T>Tg to form the shaped article,
wherein the substrate is a granular substrate, a fibrous substrate, or both.

2. The process according to claim 1, wherein the weight fraction of graphene is ≥0.5 and ≤10 parts by weight per 100 parts by weight of the dispersion polymer.

3. The process according to claim 1, wherein the dispersion polymer has a glass transition temperature of ≥15° C. and ≤60° C.

4. The process according to claim 1, wherein ≥1 g and ≤100 g of binder defined as a summed total amount of the dispersion polymer and graphene solids is present per 100 g of the substrate after the applying.

5. The process according to claim 1, wherein the drying temperature T satisfies T≥Tg+5° C.

6. The process according to claim 1, wherein the substrate is a fiber web.

7. The process according to claim 1, further comprising: shaping the treated substrate after the applying of the aqueous dispersion PG.

8. The process according to claim 1, wherein the shaped article has a greater electrical conductivity than an electrical conductivity of the substrate prior to the applying.

9. The process according to claim 1, wherein the dispersion polymer comprises:
≥50 and ≤99.9 wt % of at least one selected from the group consisting of esters of acrylic acids with alkanols of 1 to 12 carbon atoms, esters of methacrylic acids with alkanols of 1 to 12 carbon atoms, and styrene in polymerized form, or
≥40 and ≤99.9 wt % of styrene, butatdiene, or both in polymerized form, or
≥50 and ≤99.9 wt % of vinyl chloride, vinylidene chloride, or both in polymerized form, or
≥40 and ≤99.9 wt % of at least one selected from the group consisting of vinyl acetate, vinyl propionate, and ethylene in polymerized form.

10. The process according to claim 9, wherein the dispersion polymer further comprises:
≥0.1 and ≤5 wt % of at least one selected from the group consisting of a 3 to 6 carbon atom α,β-monoethylenically unsaturated monocarboxylic acid, an amide thereof, a 3 to 6 carbon atom α,β-monoethylenically unsaturated dicarboxylic acid, and an amide thereof in polymerized form.

11. The process according to claim 1, wherein the dispersion polymer comprises:
≥10.0 and ≤20.0 wt % of n-butyl acrylate in polymerized form,
≥0 and ≤5.0 wt % of N-methylolacrylamide in polymerized form,
≥45.0 and ≤60.0 wt % of ethyl acrylate in polymerized form,
≥0 and ≤5.0 wt % of acrylamide, methacrylamide, or both in polymerized form, and
≥20 and ≤40.0 wt % of acrylonitrile, methacrylonitrile, or both in polymerized form.

12. The process according to claim 1, wherein the substrate is a glass fiber web and the shaped article has a specific conductivity of at least $1.0 \times 10^{-3}$ S/cm.

13. The process according to claim 1, wherein the substrate is a glass fiber web and the shaped article has a resistance of less than $7.0 \times 10^4$ ohms.

* * * * *

UNITED STATES PATENT AND TRADEMARK OFFICE
CERTIFICATE OF CORRECTION

PATENT NO. : 10,266,662 B2
APPLICATION NO. : 15/301842
DATED : April 23, 2019
INVENTOR(S) : Lucia Jimenez Garcia et al.

Page 1 of 1

It is certified that error appears in the above-identified patent and that said Letters Patent is hereby corrected as shown below:

In the Specification

In Column 1, Line 10, delete "is 0.01 and 20" and insert -- is $\geq 0.01$ and $\leq 20$ --, therefor.

In Column 3, Line 55, delete "interentangled" and insert -- intertangled --, therefor.

In Column 4, Line 21, delete "(cf." and insert -- cf. --, therefor.

In Column 4, Line 23, delete "if." and insert -- ff. --, therefor.

In Column 4, Line 31, delete "(1969)]." and insert -- (1969). --, therefor.

In Column 10, Line 20, delete "Zosel" and insert -- Zostel --, therefor.

In Column 10, Line 20, delete "and" and insert -- und --, therefor. (second occur.).

In Column 11, Line 45, delete "monoplies" and insert -- monopolies --, therefor.

In the Claims

In Column 18, Line 4, Claim 9, delete "butatdiene," and insert -- butadiene, --, therefor.

Signed and Sealed this
Fourteenth Day of April, 2020

Andrei Iancu
*Director of the United States Patent and Trademark Office*